United States Patent
Azam et al.

(10) Patent No.: US 10,978,060 B2
(45) Date of Patent: Apr. 13, 2021

(54) VOICE INPUT COMMAND

(71) Applicant: HEWLETT-PACKARD DEVELOPMENT COMPANY, L.P., Fort Collins, CO (US)

(72) Inventors: Syed S Azam, Houston, TX (US); Yetian Huang, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/114,386

(22) PCT Filed: Jan. 31, 2014

(86) PCT No.: PCT/US2014/014091
§ 371 (c)(1),
(2) Date: Jul. 26, 2016

(87) PCT Pub. No.: WO2015/116151
PCT Pub. Date: Aug. 6, 2015

(65) Prior Publication Data
US 2016/0358603 A1    Dec. 8, 2016

(51) Int. Cl.
*G10L 15/22* (2006.01)
*G10L 15/26* (2006.01)
(Continued)

(52) U.S. Cl.
CPC .............. *G10L 15/22* (2013.01); *G06F 3/167* (2013.01); *G10L 15/1815* (2013.01);
(Continued)

(58) Field of Classification Search
CPC ....... G10L 15/22; G10L 15/32; G10L 15/265; G10L 2015/088; G10L 2015/228; G06F 3/167
(Continued)

(56) References Cited

U.S. PATENT DOCUMENTS 5,737,724 A * 4/1998 Atal ................. G10L 15/10
704/251
6,418,199 B1 * 7/2002 Perrone ............ G06F 16/3334
379/88.01
(Continued)

FOREIGN PATENT DOCUMENTS

CN  103226949   7/2013
EP  1073036     1/2001
(Continued)

OTHER PUBLICATIONS

Accuspeechmobile: Universal Voice Utility-Capabilities, (Web Page), 2013, 1 Page, http://www.vangardvoice.com/Universal_Voice_Utilities_Capabilities.html.
(Continued)

*Primary Examiner* — Fariba Sirjani
(74) *Attorney, Agent, or Firm* — Dicke Billig & Czaja PLLC

(57) ABSTRACT

A method is provided in accordance with an aspect of the present disclosure. The method includes detecting at least one voice input from a user of an electronic device, transforming the at least one voice input into a text structure including at least one word, and determining a current context scope of the electronic device. The method also includes comparing the text structure to a plurality of existing text structures, where each of the existing text structure associated with a command for an action on the electronic device. The method further includes identifying, when the text structure matches with at least one of the existing text structures, a command to correspond to the at least one voice input from the user, and performing an action on the electronic device based on the identified command.

18 Claims, 8 Drawing Sheets

(51) Int. Cl.
*G06F 3/16* (2006.01)
*G10L 15/18* (2013.01)

(52) U.S. Cl.
CPC ........ *G10L 15/26* (2013.01); *G10L 2015/223* (2013.01); *G10L 2015/228* (2013.01)

(58) Field of Classification Search
USPC ....................................................... 704/275
See application file for complete search history.

(56) References Cited

U.S. PATENT DOCUMENTS

| | | | |
|---|---|---|---|
| 6,532,444 B1* | 3/2003 | Weber | H04L 29/06 704/257 |
| 7,069,220 B2* | 6/2006 | Coffman | G10L 15/22 704/275 |
| 8,165,886 B1* | 4/2012 | Gagnon | G10L 15/19 704/275 |
| 8,452,602 B1 | 5/2013 | Bringert et al. | |
| 9,905,226 B2* | 2/2018 | Bishop | G06F 3/167 |
| 9,922,642 B2* | 3/2018 | Pitschel | G10L 15/063 |
| 2003/0014260 A1* | 1/2003 | Coffman | G10L 15/22 704/275 |
| 2003/0177013 A1* | 9/2003 | Falcon | G10L 15/193 704/275 |
| 2004/0117189 A1 | 6/2004 | Bennett | |
| 2006/0074658 A1* | 4/2006 | Chadha | G10L 15/26 704/246 |
| 2008/0010071 A1 | 1/2008 | Callahan et al. | |
| 2008/0133230 A1 | 6/2008 | Herforth | |
| 2009/0018830 A1 | 1/2009 | Emmanuel | |
| 2010/0031150 A1* | 2/2010 | Andrew | G10L 15/22 715/728 |
| 2010/0031151 A1* | 2/2010 | Cross | G10L 15/22 715/728 |
| 2010/0094635 A1* | 4/2010 | Bermudez Perez | G06F 16/95 704/270.1 |
| 2011/0025842 A1* | 2/2011 | King | G06F 17/211 348/135 |
| 2012/0265528 A1* | 10/2012 | Gruber | G10L 15/183 704/235 |
| 2013/0219277 A1* | 8/2013 | Wang | G06F 3/167 715/728 |
| 2013/0246050 A1* | 9/2013 | Yu | G10L 15/1822 704/9 |
| 2014/0278413 A1* | 9/2014 | Pitschel | G10L 15/22 704/243 |
| 2014/0371912 A1* | 12/2014 | Passot | G06N 3/008 700/264 |
| 2015/0081295 A1* | 3/2015 | Yun | G10L 17/005 704/236 |
| 2015/0212791 A1* | 7/2015 | Kumar | G06F 3/167 715/728 |
| 2016/0358603 A1* | 12/2016 | Azam | G10L 15/1815 |
| 2017/0200455 A1* | 7/2017 | Aggarwal | G10L 15/22 |

FOREIGN PATENT DOCUMENTS

| | | |
|---|---|---|
| EP | 2575128 | 4/2013 |
| TW | 200506709 A | 2/2005 |
| TW | M343204 | 10/2008 |
| TW | 200847004 A | 12/2008 |
| TW | 201044265 A | 12/2010 |
| TW | 201212561 A | 3/2012 |
| TW | M453219 | 5/2013 |
| TW | 201349004 A | 12/2013 |
| WO | WO-2012090196 | 7/2012 |

OTHER PUBLICATIONS

Sharma, K. et al., Exploration of Speech Enabled Systems for English, (Research Paper), Nov. 19, 2012., 9 Pages, http://arxiv.org/ftp/arxiv/papers/1304/1304.8013.pdf.

Vishwajeet, Y. et al., Speech Enabled Operating System Control Using Sphinx4, (Research Paper), Jun. 2, 2013, 5 Pages, http://www.enggjournals.org/v1i202.pdf.

* cited by examiner

VOICE INPUT COMMAND

BACKGROUND

Increasing number of today's users carry or operate one or more electronic devices that are equipped with a diverse set of functions. These devices can communicate with each other, reach the Internet, perform different tasks, or access various data services through networks. Various devices such as personal computers, all in one computing devices, Internet-enabled tablets, smart phones, laptops, televisions, and gaming consoles have become essential personal accessories, connecting users to friends, work, and entertainment. Users now have more choices and expect to efficiently access programs, data, and other content on all types of devices at all times. The large number of users that utilize different type of electronic devices stimulates providers to offer devices that can meet the increase in user demand, support the broad array of available services, and provide reliable communication.

DETAILED DESCRIPTION

Figure 1:
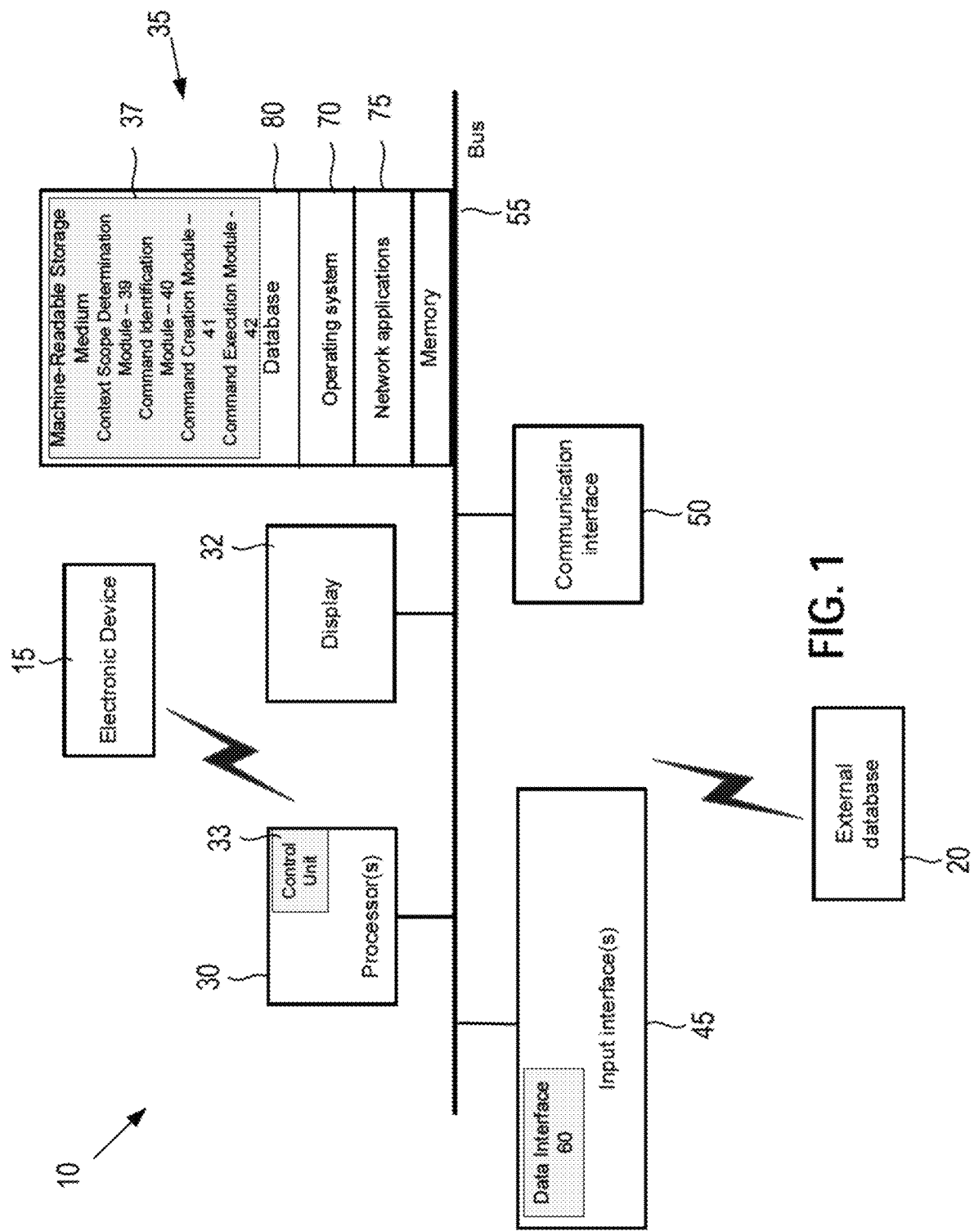
FIG. 1 is a schematic illustration of an example of an electronic device in accordance with an implementation of the present disclosure.

With the recent improvements in technology, electronic devices (e.g., tablets, laptops, display screens, smartphones, etc.) continue to play an increasing role in people's life. Different users rely on different type of electronic devices for many day-to-day activities and work related tasks. The large number of users that utilize different type of electronic devices stimulates providers to offer devices that can meet the increase in user demand, support the broad array of available services, and provide ratable communication.

Electronic devices come in different sizes, forms, and may include different technical features. Due to the proliferation of electronic devices, their technological capabilities are continuously increasing. Consequently, these devices also offer expanded services to their users. These electronic devices are often used to access the Internet, purchase various goods and services, and perform various personal and business related functions.

Many of the electronic devices include a touchscreen that enables a user to interact with the electronic device and the content displayed on the display screen directly, rather than indirectly by using an external input device (e.g., a mouse). The user can utilize the touchscreen to control operations on the electronic device; to respond to any displayed content (e.g., messages, emails, etc.), and to control how the contend is displayed on the screen (e.g., by rooming the text or image size).

However, touchscreen technology does not always perform as intended and it cannot be used in all occasions. For example, when the user's hands are busy, dirty, or wet, a user may not use his or her fingers to interact with the electronic device. In addition, when the user is away from the display touching the display becomes an impossible task.

Therefore, users are always looking for alternative and more effective ways to control their electronic devices. Controlling electronic devices via speech provides a great alternative to touchscreen control and allows a fast and easy way for users to Interact with the device. Using voice commands to control the electronic device allows a user to perform different tasks on the device while his or her hands are still free to perform other activities.

The present description is directed to systems, methods, and computer readable media for controlling all operations of an electronic device with voice commands The present description proposes an approach for voice control of an electronic device based on the current context, scope (e.g., running application, etc.) of the device and the received voice command (s) from the user. The present description allows navigating and operating the operating system ("OS") of an electronic device with voice by using, creating user commands, and editing user commands. Therefore, the present description does not require a personal assistant application to control specific functions of the electronic device, but spreads voice control functionality through the entire OS of the electronic device so a user may provide commands anytime and anywhere without going back to a specific application.

The disclosed systems, methods, and computer readable media detect voice input from the user of the electronic device and transform it to a text structure. Based on the identified context scope (application, process, etc.) running on the electronic device, the systems, methods, and computer readable media attempt to match the identified text structure with an existing command for the particular context scope. If a matching command is identified, the disclosed systems, methods, and computer readable media perform an action on the electronic device based on the command. Thus, the disclosed systems, methods, and computer readable media may perform various operations on the electronic device that are currently performed with different input devices (e.g., mouse, keyboard, touch input, etc.). Complete navigation through the OS of the device is possible with the proposed systems, methods, and computer readable media.

In addition, the proposed voice control solution uses various techniques to identify sequential voice inputs from the user and to identify a command based on the relationship of these sequential voice inputs. Further, the techniques described herein may detect a command even when the received voice input from the user is not clearly matched to an existing command by the electronic device. These techniques help a user to better control the operations of the electronic device via voice input.

The proposed solution also offers a unique process for creating new commands and for editing of existing commands for me electronic device. The new commands may be associated with the context scope of the electronic device and may include different actions to be performed on the electronic device at that specific context. The disclosure also described techniques for training the electronic device to perform various operations based on voice commands identified by the specific user of the device.

Thus, the techniques described in this description allow a user to operate an electronic device by using voice commands that are identified based on the specific context scope of the electronic device. The proposed voice control solution may utilize natural language processing technologies to improve command recognition accuracy. The solution offers a concept that can achieve much higher command recognition accuracy and may be easily controlled. Every user may supplement the offered services be creating and editing his or her commands and personalizing the described system to their own needs. This creates a great flexibility to all users and makes the proposed voice control technology very attractive to consumers. The proposed voice control solution is applicable to all type of electronic devices but may be especially helpful in interaction with devices that have a large display.

In an example implementation, a method for constructing market segments of consumers is provided. As with other methods described in this disclosure, the method can be performed by a processor of the electronic device. For instance, a non-transitory machine-readable storage medium may store computer programs or modules, which when executed by the electronic device cause the method to he performed. The method includes detecting at least one voice input from a user of an electronic device, transforming the at least one voice input into a text structure including at least one word, and determining a current context scope of the electronic device. The method also includes comparing the text structure to a plurality of existing text structures, where each of the existing text structure is associated with a command for an action on the electronic device. The method further includes identifying, when the text structure matches with at least one of the existing text structures, a command to correspond to the at least one voice input from the user, and performing an action on the electronic device based on the identified command.

In another example implementation, a system for constructing market segments of consumers is provided. The system includes an electronic device having at least one processing device. The processing device includes a control unit to create a new command for the electronic device, where the new command Is associated with a context scope of the electronic device and includes an action on the electronic device. The control unit is also to detect at least one voice input from a user of an electronic device, transform the at least one voice input into a text structure including at least one word, and determine the current context scope of the electronic device. The control unit is further to compare the text structure to a plurality of existing text structures and to identify a command when the text structure matches with at least one of the existing text structures.

In yet another example implementation, a non-transitory machine-readable storage medium encoded with instructions executable by at least one processing device is provided. The machine-readable storage medium comprises instructions to process at least one voice input received from a user of the electronic device, transform the at least one voice input into a text structure including at least one word, and determine the current context scope of the electronic device. The machine-readable storage medium further comprises instructions to determine whether the text structure matches with at least one existing text structure from a plurality of existing text structures that are associated with the current context, and to determine whether the text structure matches with at least one existing text structure from a plurality of existing text structures that are not associated with the current context. The machine-readable storage medium also comprises instructions to identify, when the text structure matches with at least one of the existing text structures, a command to correspond to the at least one voice input from the user, and create a new command for the electronic device when the when the text structure does not match with at least one of the existing text structures. The new command is associated with the current context scope.

As used herein, the term "electronic device" refers to any one of various smartphones, display screens, cellular telephones, tablets, personal data assistants (PDA's), laptops, computers, servers, and other similar electronic devices that include a display, a processor, and are capable of displaying Images on the display and are capable of communicating with other electronic devices via wireless or wired communication networks.

As used herein the terms "context scope" refers to the contest of an electronic device. In other words, context scope refers to the application, process, or activity that is currently running on the electronic device (e.g., video-sharing application, game, browser, home screen, etc.).

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore. Is not to be taken in a limiting sense, and the scope of the present disclosure is defined by the appended claims. Also, it is to be understood that the phraseology and terminology used herein is for the purpose of description and should not be regarded as limiting. The use of including; "comprising" or "having" and variations thereof herein is meant to encompass the items listed thereafter and equivalents thereof as well as additional items. It should also be noted that a plurality of hardware and software based devices, as well as a plurality of different structural components may be used to Implement the disclosed methods and systems.

FIG. 1 is a schematic illustration of an example of an electronic device 10 capable of carrying out the techniques described below. The electronic device 10 may be s mobile electronic device (e.g., a smartphone), a stationary electronic device (e.g., a desktop computer, a display screen etc.), a convertible electronic device (e.g., a convertible laptop), or any other type of electronic device. For example, the electronic device 10 may be a tablet, a laptop, a personal computer, an all in one computing device, a gaming console, a server, a smartphone, a music player a visual player, a personal digital assistant (PDA), a cellular telephone, an electronic notepad, a plurality of distributed computing devices, or any other suitable electronic device that includes a display and a processor, in the illustrated example, the electronic device 10 includes at least one processing device 30 (also called a processor), a display 32, a memory resource 35, input interfaces) 45, and communication interface 50. In other examples, the electronic device 10 includes additional, fewer, or different components for carrying out the functionality described herein.

As explained in additional detail below, the electronic device 10 includes software, hardware, or a suitable combination thereof configured to enable functionality of the electronic device 10 and to allow it to carry the techniques described below and to interact with the one or more external systems/devices. For example, the electronic device ID includes communication interfaces (e.g., a Wi-Fi® interface, a Bluetooth® interface, a 3G interface, a 4G interface, a near filed communication (NFC) interface, etc.) that are used to connect with external devices/systems and/or to a network (not shown). The network may include any suitable type or configuration of network to allow for communication between the electronic device 10 and any external devices/systems.

As described in additional details below, in one example, the electronic device 10 can communicate with at least one electronic device 15 (e.g., a smartphone, a computing device, a server, a plurality of distributed computing devices, etc.) for remote voice control of the electronic device 10. In addition, the electronic device 10 may also communicate with an external database 20 to retrieve data related to operating commands for the device 10 or related to other processes described herein, it is to be understood that the operations described as being performed by the electronic device 10 that are related to this description may, in some implementations, be performed or distributed between the electronic device 10 and other computing devices (not shown).

The processing device 30 of the electronic device 10 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device), the memory resource 35, the input interfaces 45, and the communication interface 50 are operatively coupled to a bus 55.

The display 32 provides visual information to a user, such as various display windows, icons, tabs, video images, pictures, etc. The display 32 may also display content from different applications running on the electronic device 10 on a window shown on the display screen. The display 32 may be a transparent liquid crystal display (LCD), an organic light emitting diode (OLED) display, a plasma display, or any other suitable display. The display 32 may be part of the electronic device 10 (e.g., when the electronic device 10 is tablet or all in one device), may be a separated component that is in electronic communication with the electronic device 10 (e.g., when the electronic device is a desktop computer with a separate monitor), and may be a detachable component that may also be used as a handheld device (e.g., when the electronic device 10 is a convertible computing device). The display 32 may be of different sizes and may support various types of display resolution.

The communication interface 50 allows the electronic device 10 to communicate with plurality of networks, communication links, and external devices. The input interfaces 45 can receive information from any internal or external devices/systems in communication with the electronic device 10. In one example, the input interfaces 45 include at least a data interface 60. In other examples, the input interfaces 45 can include additional interfaces. In one implementation, the data interface 60 may receive voice inputs (e.g., from the user of the electronic device or form an external electronic device 16) or communications from the external database 20.

The processor 30 includes a controller 33 (also called a control unit) and may be implemented using any suitable type of processing system where at least one processor executes computer-readable instructions stored in the memory 35. The memory resource 35 includes any suitable type, number, and configuration of volatile or non-transitory machine-readable storage media 37 to store instructions and data Examples of machine-readable storage media 37 in the memory 35 include read-only memory ("ROM"), random access memory ("RAM") (e.g., dynamic RAM ["DRAM"], synchronous DRAM (["SDRAM"], etc.), electrically erasable programmable read-only memory ("EEPROM"), flash memory, an SD card, and other suitable magnetic, optical, physical, or electronic memory devices. The memory resource 35 may also be used for storing temporary variables or other intermediate information during execution of instructions to by the processor 30.

The memory 35 may also store an operating system 10 and network applications 75. The operating system 70 can be multi-user, multiprocessing, multitasking, multithreading, and real-time. The operating system 70 can also perform basic tasks such as recognizing input from input devices, such as a keyboard, a keypad, a mouse, a voice input from a user, etc.; sending output to a projector and a camera; keeping track of files and directories on memory 35; controlling peripheral devices, such as printers, image capture device; and managing traffic on the bus 55. The network applications 75 include various components for establishing and maintaining network connections, such as computer-readable instructions for implementing communication protocols including TCP/IP, HTTP, Ethernet®, USB®, and FireWire®.

Software stored on the non-transitory machine-readable storage media 37 and executed by the processor 30 includes, for example, firmware, applications, program data, filters, rules, program modules, and other executable instructions. The control unit 33 retrieves from the machine-readable storage media 37 and executes, among other things, instructions related to the control processes and methods described herein, in one example, the instructions stored in the non-transitory machine-readable storage media 37 implement a context scope determination module 39, a command identification module 40, a command creation module 41 and a command execution module 42. In other examples, the instructions can implement more or fewer modifies (e.g., various other modules related to the operation of the device 10). In one example, modules 39-42 may be implemented with electronic circuitry used to carry out the functionality described below. As mentioned above, in addition or as an alternative, modules 39-42 may be implemented as a series of instructions encoded on a machine-readable storage medium and executable by a processor.

In one example implementation, modules 39-42 may be pre-installed on the device 10 as a part of the OS of the device. In another example implementation, modules 39-41 may be downloaded to the device 10 (e.g., from a cloud). Thus, the processes implemented by modules 39-42 may he executed on the device 10 or in remote processing devices in communication with the device 10. As explained in additional detail below, context scope determination module 39 determines the current context scope of the electronic device after a new voice input is received at the device 10. The command identification module 40 identifies a command for the electronic device based on the received voice input (which is converted to text) and the context scope of the device 10. The command creation module 41 creates new commands for the electronic device based on the received voice input and the context scope of the device 10. The command execution module 42 performs at least one action on the electronic device 10 based on the identified command.

Information and data associated with the electronic device 10 and other systems/devices can be stored, logged, processed, and analyzed to implement the control methods and processes described herein. For example, the memory 35 may include at least one database 80. In other example implementations, the electronic device ID may access external database (e.g., database 20) that may be stored remotely of the electronic device 10 (e.g., can be accessed via a network or a cloud).

Figure 2:
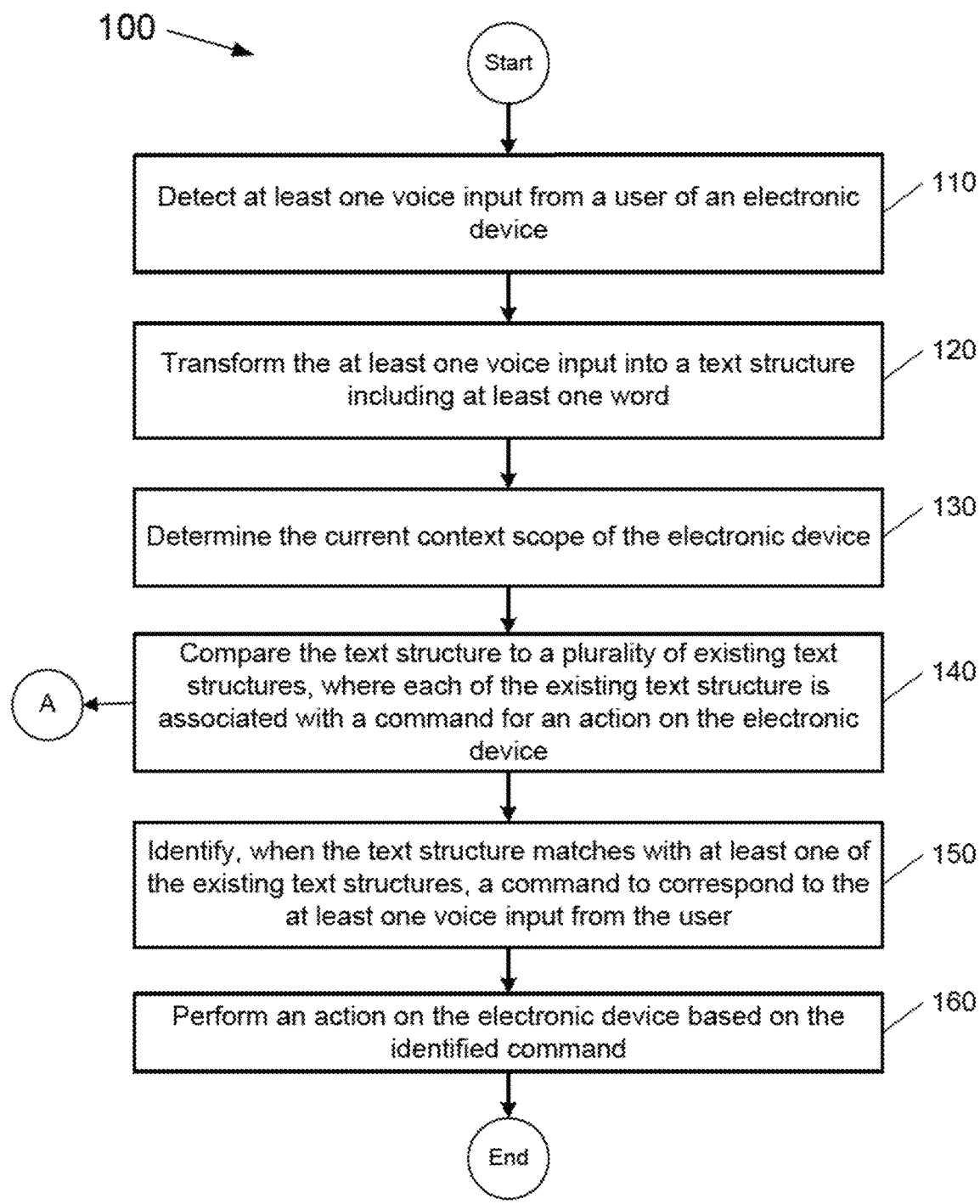
FIG. 2 illustrates a flow chart showing an example of a method for controlling the operations of an electronic device with voice commands m accordance with an implementation of the present disclosure.

FIG. 2 illustrates a flow chart showing an example of a method 100 for controlling the operations of an electronic device with voice commands. As explained in additional details below, the operations may involve performing at least one action on the electronic device 10 based on the voice input command. In one example, the method 100 can be executed by the control unit 33 of the processor 30 of the electronic device 10. Various elements or blocks described herein with respect to the method 100 are capable of being executed simultaneously, in parallel, or in an order that differs from the illustrated serial manner of execution. The method 100 is also capable of being executed using additional or fewer elements than are shown in the illustrated examples.

The method 100 may be executed in the form of instructions encoded on a non-transitory machine-readable storage medium 37 executable by the processor 30 of the electronic device 10. In one example, the instructions for the method 100 implement the context scope determination module 39, the command identification module 40, the command creation module 41, and the command execution module 42. In other examples, the execution of the method 100 may be distributed between the processing device 30 and other processing devices in communication with the processing device 30.

The method 100 begins at block 110, where the processor 30 detects at least one voice input from a user of an electronic device 10. The user may directly provide the voice input to the device (e.g., by speaking at the device 10). Alternatively, the voice input may be provided remotely. For instance, a user may utilize another device (e.g., the electronic device 15) that is in communication with the device 10 to provide voice input to the device 10. The user may provide voice input to the device 15 that transmits the voice input to the electronic device 10 (e.g., via a communication interface). That allows the user to perform remote voice control of the device 10. That may be very helpful for devices 10 that have large display (e.g., advertising displays in public areas), where the microphone of the device may not be able to detect direct voice communicate from a user.

In some examples, the control unit 33 of the processor 30 uses existing voice recognition tools and/or applications to detect the at least one input from the user. In other examples, speech recognition tools may be provided by one of the modules 39-42. The voice input from the user may include at least one word or a phrase that is intended to control the operation of the device 10 and to perform an action on the device 10. Voice inputs by the user may include: "open notification" "open quick settings," scroll down, "scroll up," "take a screenshot," "close dialog;" and other inputs. Next, at 120, the control unit 33 transforms the at least one voice input into a text structure that includes at least one word. For example, the control unit 33 uses the existing voice recognition tool or application on the device 10 to transform the voice input to a text structure.

At 130, the control unit 33 determines a current context scope of the electronic device. This may be performed by the context scope determination module 39. The current context scope of the electronic device is the application, process, or activity that is currently running on the device or is being performed by the device. For example, if the user is browsing the internet with the device 10, the current context scope is the browser. If the user is watching a video on a video-sharing website, the current context scope is that video-sharing website. When the user is at the home screen of the device 10, the current context scope is the home screen of the device. Determining the current context scope of the device 10 benefits the described process because the processor 30 may analyze the voice input much more accurately based on the context scope of the device. As explained in additional details below, every voice command may be associated to a distinct action depending on the context scope of the device 10.

With continued reference to FIG. 2, the control unit 33 compares the text structure from the user's voice input to a plurality of existing text structures (at 140). Steps 140 and 150 may be performed by the command identification module 39. Each of the existing text structures may be associated with a command for an action on the electronic device. In one example, the plurality of existing text structures are "local," and they are associated with a specific context scope of the electronic device 10 (e.g., home screen, application, browser, etc.). For instance, a plurality of predetermined text structures may be associated with each of the possible context scopes of the electronic device. In other words, these existing text structures represent commands that may be performed only at the specific context space (i.e., application, etc.). When the current context scope of the electronic device 10 is the browser, existing text structures (i.e., commands) for the browser may include: "move down, scroll down, scroll to the bottom, scroll up, move up, up, down, more, go to the top, go to the bottom, go to the top of the page, go to, forward, go forward, move forward, refresh, reload, refresh the page, refresh page, reload the page, reload page, page reload, stop loading, etc." In addition, existing text structures for a camera application may include: "shoot, photos, print, share, etc." Other context scopes of the device 10 may have a different plurality of existing text structures associated with them.

In addition, a different plurality of existing text structures may not be associated with a current context scope of the electronic device 10. These existing text structures may be "global" text structures that represent commands that may be performed on a system level and may not only available for a specific application. Such "global" text structures may include: "open notifications, open notification, clear notifications, clear notification, close notifications, close notification, close, back, return, go back, come back, home, home screen, go to home screen, press home button, type "a, b, c . . . ," spell, recent app, running tasks, caps lock, turn n caps lock, turn off caps lock, type space, back space, sleep, lock screen, go, enter, wake up, take a screenshot, etc." In some example implementations, some existing text structure may both "local" and "global."

In one example, the existing text structures (both "local" and "global") may be stored in a database. That may be the be the database 80 of the device 10, the external database 20, or any other external database where text structures may be accessed by the processor 30 during the operation of modules 39-42. Each of the existing text structures is associated with a command (also stored in a database) that includes at least one action for the electronic device (e.g., open a new tab, etc.). By performing the actions based on the user's voice input, a user may perform voice control of the operations of the device 10.

Figure 3:
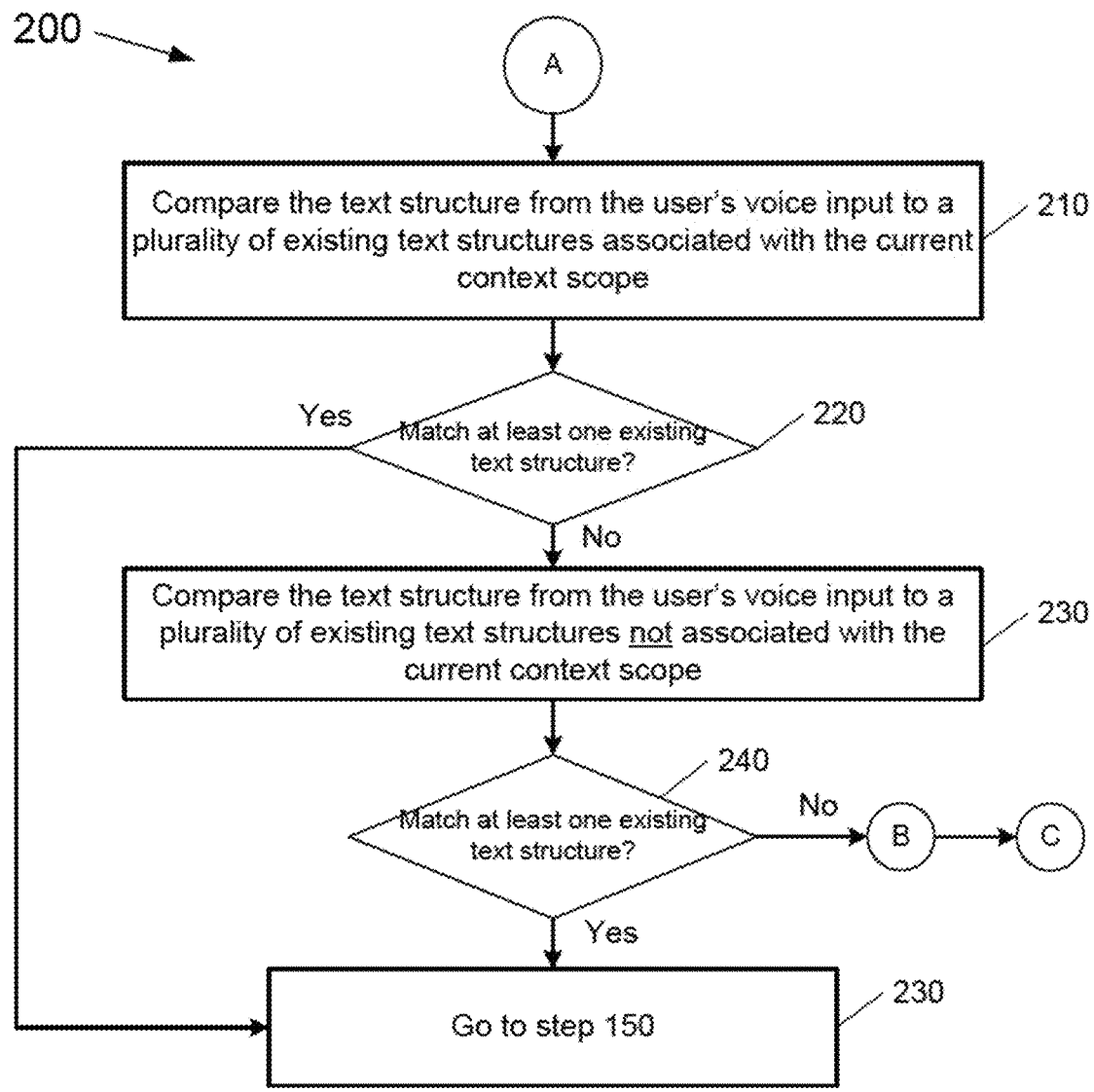
FIG. 3 illustrates a flow chart showing an example of a method for comparing a text structure from a user's voice input to a plurality of existing text structures in accordance with an implementation of the present disclosure.

FIG. 3 illustrates a method 200 for comparing the text structure from the users voice input to a plurality of existing text structures, in one example, the method 200 can be executed by the control unit 33 of the processor 30. Various elements or blocks described herein with respect to the method 200 are capable of being executed simultaneously, in parallel, or in an order that differs from the illustrated serial manner of execution. The method 200 is also capable of being executed using additional or fewer elements than are shown in the illustrated examples. The method 200 may be executed in the form of instructions encoded on a non-transitory machine-readable storage medium 37 executable by the processor 30 of the electronic device 10. In one example, the instructions for the method 100 implement the command identification module 39.

The method 200 begins at 210, where the control unit 33 compares the text structure from the user's voice input to a plurality of existing text structures associated with the current context scope. For example, if the identified current context scope is a game application, the control unit 33 compares the text structure with existing text structures that are associated with that game application. The control unit 33 determines whether a match exists between the text structure from the user's voice and the existing text structures for the context scope (at 220). If the identified text structure matches to at least one of the plurality of existing text structures associated with the current context scope, the control unit 33 proceeds to step 150 of the method 100.

The control unit 33 compares the text structure to a plurality of existing text structures that are not associated with the current context scope of the electronic device, when the text structure does not match the existing text structures that are associated with the current context scope of the electronic device 10 (at 230). Thus, the control unit has identified that no existing "local" command matches the user's voice input and moves to analyze the "global" commands. The control unit 33 then determines whether a match exists (at 240) between the text structure and the existing "global" text structures. If the identified text structure matches to at least one of the plurality of existing text structures that are not associated with the current context scope, the control unit 33 proceeds to step 150 of the method 100. If no match is found, the control unit 33 executes a matching process (step B) based on a possibility score of the command and a tolerance threshold (described below in relation to FIG. 5). Further, if the control unit is unsuccessful with the matching process based on the possibility score of the command and the tolerance threshold, the control unit may create a new command for the electronic device (step C), which is described below in relation to FIGS. 7 and 8.

With continued reference to FIG. 2, the control unit 33 identifies a command to correspond to the at least one voice input from the user when the text structure matches with at least one of the existing text structures (at 150). As noted above, each of the existing text structures is associated with a command that includes at least one action for the electronic device. The existing text structures and the associated commands are stored in a database (20, 80, etc.). These databases may be updated with new commands created by a user or supplied by a third party that may offer the described system and processes as a service, in one example, the commands and the actions associated with the commands are organized as Extensible Markup Language ("XML") files. Thus, when the text structure of the voice input matches with an existing text structure associated with the current context space, the control unit identifies a command that corresponds to that text structure and, consequently, to the voice input of the user. Alternatively, when the text structure of the voice Input matches with an existing "global" text structure not associated with the current context space, the control unit identifies a command that corresponds to that text structure and, consequently, to the voice input.

At 160, the control unit 33 performs an action on the electronic device 10 based on the identified command. This may be performed with the command execution module 42. For instance, each command may be associated with a software code rule that communicates with the OS of the device 10 to execute the command. The software rule describes the action(s) that are to be performed by the OS. The OS of the device 10 may expose Application Programming Interfaces ("APIs") for third-party software, allowing communication with the OS. For example, the command execution module 42 may send an abstract description of an action or operation to be performed on the device 10 to the OS for launching another application. That abstract description may include the name of the desired application. The OS may perform the action of launching the specified application. In alternative, the command execution module 42 may directly communicate with the desired application (e.g., the browser application) to send an abstract description of an action to be performed. The application then determines what the request is and performs the action (e.g., scroll down). Thus, the control unit 33 controls the operations of the electronic device 10 based on the user's voice inputs.

In some situations, the user may provide a voice input to the device 10, pause for a period of time (e.g., 5, 10, 15 seconds, etc.), and then provide a sequential voice input that may or may not be related to the first voice input. In such situations, it may be difficult for the control unit 33 to analyze the two sequential voice inputs and to compare them to existing text structures to identify a command that corresponds to the two sequential voice inputs. Thus, this disclosure proposes a method of connecting at least two sequential voice inputs from a user and performing an action based on the connected sequential voice inputs.

Figure 4:
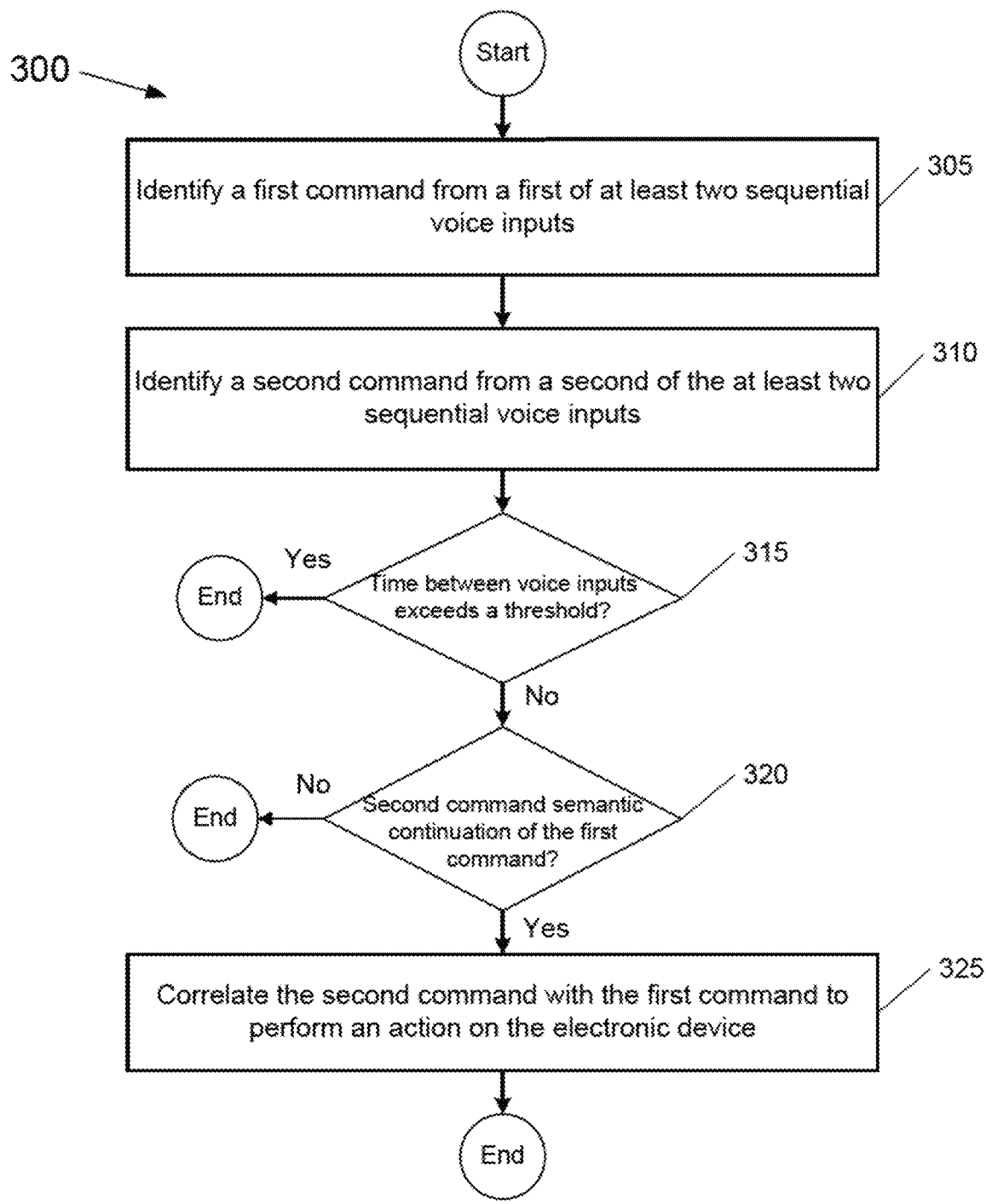
FIGS. 4 illustrates a flow chart showing an example of a context perception method for connecting at least two sequential voice inputs from a user to identify a command in accordance with an implementation of the present disclosure.

FIG. 4 illustrates a context perception method 300 for connecting at least two sequential voice inputs from a user to identify a command. The method interprets the relationship between a series (e.g., at least two) consecutive commands by the user, in one example, the method 300 can be executed by the control unit 33 of the processor 30. The method 300 may be executed in the form of instructions encoded on a non-transitory machine-readable storage medium 37 executable by the processor 30 of the electronic device 10.

The method 300 begins at 305, where the control unit 33 identifies a first command from a first of the at least two sequential voice inputs. Then, the control unit 33 identifies a second command from a second of the at least two sequential voice inputs (at 310). For instance, the first and the second commands are identified as described is steps 110-150 of the method 100. Next, at 315, the control unit 33 determines whether the time between the first voice input and the second voice input exceed a predetermined threshold. That threshold may be set by the user of the device or may be predetermined. In some examples, the threshold may be 5, 10, 15 seconds, or any other reasonable threshold. The purpose of the threshold is determine whether the user has completed inputting (i.e., speaking) the first command and the second command is a new command, or whether the second command is a continuation of the first command.

When the control unit 33 determines that time between the first voice input and the second voice input exceed the predetermined threshold, the control unit ends the process. In that situation, the control unit determines that the two commands are not related since the second command was received after the predetermined threshold time and, therefore, it is probably a new command by the user. Alternatively, when the control unit 33 determines that time between the first voice input and the second voice input does not exceed the predetermined threshold, the control determines whether the second command is a semantic continuation of the first command or it is a new command that is not related to the first command (at 320). If the second command is not a semantic continuation of the first command, the control unit ends the process. If, on the other hand, the second command is a semantic continuation of the first command, the control unit 33 correlates the second command with the first command to perform an action on the electronic device (at 325). In one example, a first command may be a semantic continuation of a second command, when the second command is a predefined sub command related to the second command. Each of the existing commands may include a list of related subcommands. Other methods for identifying a semantic continuation between the commands may also be used.

For example, if the first command is "volume down," the second command is "more," and the second command does not exceed the threshold, the control unit determines that the second command is a is a semantic continuation of the first command. The "more" command may be identified as a sub command of the "volume down" command. In other words, it is likely that the user would want to execute the "volume down" command again to further lower the volume. In that case, the control unit performs the action associated with the "volume down" command. By applying the method 300, the proposed solution is more accurate in recognizing the users commands and intentions.

Many times, the control unit 33 may not be able to directly match the user's voice input to an existing text structure associated with a command. This may due to that fact that most users prefer to provide unstructured voice commands (i.e., in different forms) instead of memorizing specific preexisting commands. In order to improve the process of identifying a command to correspond to the at least one voice input from the user, the control unit 33 executes a matching process based on a possibility score of the command and a tolerance threshold.

Figure 5:
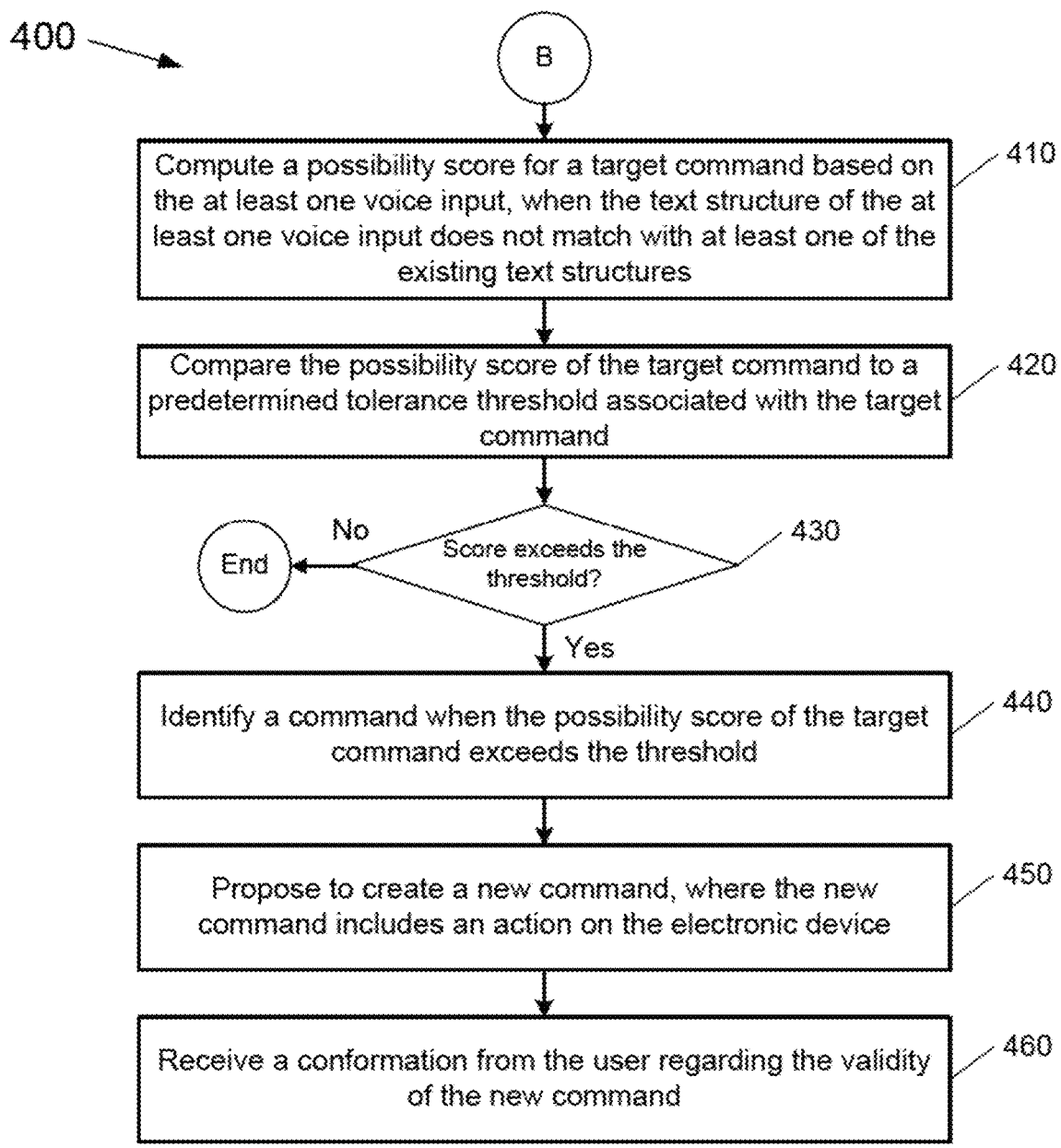
FIG. 5 illustrates a flow chart showing an example of a method for identifying a command to correspond to at least one voice input from a user when there is no direct match with an existing command in accordance with an implementation of the present disclosure.

FIG. 5 illustrates a method 400 for identifying a command to correspond to the at least one voice input from the user when there is no direct match with an existing command. The method interprets the relationship between a series (e.g., at least two) consecutive commands by the user. In one example, the method 400 can be executed by the control unit 33 of the processor 30. The method 400 may be executed in the form of instructions encoded on a non-transitory machine-readable storage medium 37 executable by the processor 30 of the electronic device 10.

The method 400 begins at 410, where the control unit 33 computes a possibility score for a target command based on the at least one voice input when the text structure of the at least one voice input does not match with at least one of the existing text structures. In other words, when the text structure of the voice input does not directly match with the existing "local" or the "global" text structures, the control unit 33 identifies a target command and calculates a possibility score for that target command. The target command represents a potential match of the text structure with an existing text structure associated with a command. The possibility score indicates that possibility that the target command is equivalent to the actual existing command.

The control unit 33 may use various techniques to identify a target command and to calculate a possibility score for that target command. For example, the control unit 33 may use a keyword snatch tolerance method, where the target command is very similar to at least one of the existing commands (e.g., the target command is "make a screenshot" where the actual existing command is "take a screenshot" and the word "screenshot" is a keyword). In another example, the control unit may use a synonym tolerance method to identify the target command (e.g., the target command is "look for x; y, z" and the actual existing command is "find x, y, z"). The control unit may use a dictionary API or a word library to find a synonym in an existing text structure in the received text structure.

In yet another example, the control unit 33 may use a spelling mode tolerance method, where a user may activate a "spell" mode in order to spell a provided command. In the "spell" mode, the control unit 33 maps any homophonic words with single letters (e.g., "see" to "c," "you" to "u" "are" to "r," etc.) A user may spell a commend after entering "spell" mode (e.g., by speeding "spell c," "c," etc.). This is helpful when voice recognition applications fail to detect letters/words spelled by the user. In another example, the control unit may use a pronunciation-alike word tolerance method, where the target command may be pronounced similarly to at least one existing commands (e.g., the target command is "go to command tap" where the actual existing command is "go to command tab").

In one example, if the control unit 33 identifies mom than one possible target, command based on the text structure, the control unit may select the target command with the highest possibility score to match to an existing command. In another example, the control unit 33 compares the possibility score of the identified target command to a predetermined tolerance threshold associated with the target command (at 420). At 430, the control unit determines whether the possibility score of the target command exceeds the tolerance threshold associated with the target command. When the possibility score of the target command exceeds the tolerance threshold associated with the target command, the control unit 33 identifies a command from the existing text structures/commands (at 440). Since the control unit already identified the current context scope in 410, only existing text structures in that context or "global" text structures are considered. If, on the other hand, the possibility score of the target command does not exceed the tolerance threshold associated with the target command, the control unit 33 ends the process.

At 440, if an ambiguity still exists about the potential command based on the users voice input, the control unit 33 may make a suggestion to the user of the device 10 regarding the target command. For example, if the text structure from the user's voice input is "create a tab" and the target command is "open a new tab," the control unit may display a message box on the screen 32. The message box may display a message to the user (e.g., "do you want to open a new tab?"), if the user rejects the suggestion, the control unit may propose the command that has the next higher possibility score in the same manner, in addition, the control unit 33 may also propose to create a new command (at 450) that includes an action on the electronic device For example, in the message box, the control unit 33 may display a new command suggestion message (e.g., "Add "create a tab" command?") and present the user with an option to approve the suggested command. Thus, the new command may perform the same action as the target command. The control unit also receives a conformation from the user regarding the validity of the new command (at 460). That way, the new command is associated with an existing text structure and includes an action on the electronic device (e.g., the action associated with the existing text structure of the target command).

If the user does not want to create a new command based on the target command but he or she identifies a command from the existing command, the control unit 33 may implement learning techniques to improve the possibility score for the target command. Thus, when the user provides the same voice input/command in the same context scope, the control unit applies the learning techniques and calculates a higher possibility score for the "new" voice input/command.

Figure 6:
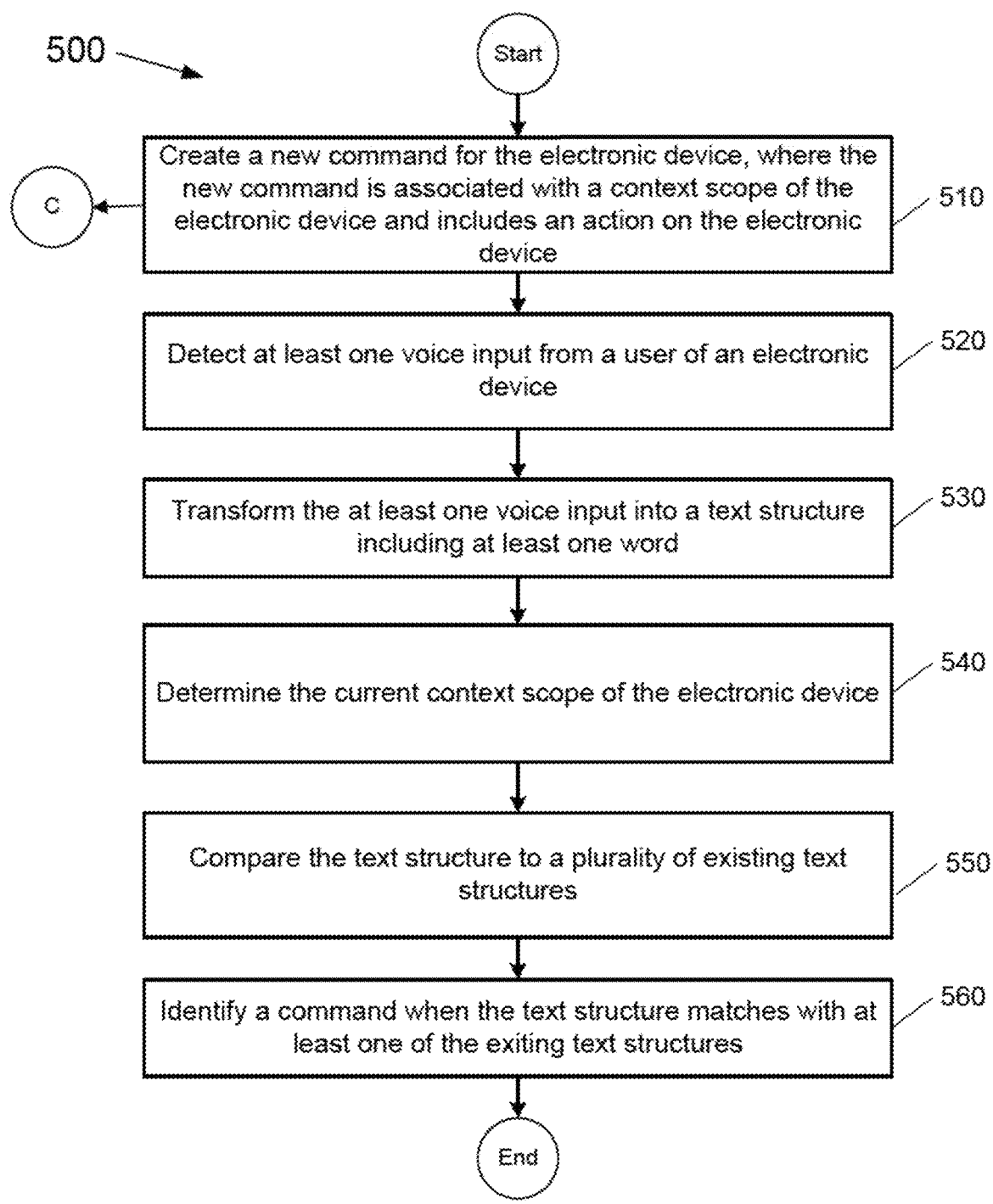
FIG. 6 frustrates a flow chart showing an example of an alternative method for controlling the operations of an electronic device with voice commands in accordance with an implementation of the present disclosure.

FIG. 6 illustrates a flow chart showing an example of an alternative method 500 for controlling the operations of an electronic device with voice commands. The method 500 may be executed with the context scope determination module 39, the command identification module 40, the command creation module 41, and the command execution module 42. These modules may be implemented with electronic circuitry use-d to carry out the functionality described below. Alternatively, modules 39-42 may be implemented in the form of instructions encoded on a non-transitory machine-readable storage medium 37 executable by the processor 30 of the electronic device 10.

The method 500 begins at block 510, where the control unit 33 creates a new command for the electronic device. In one example, the new command is associated with a context scope of the electronic device and includes an action on the electronic device. As described in additional details below, the new command is saved by the control unit (e.g., in the database 20, 80, or another database accessible by the processor 30). The specific processes for creating the new command are described below in relation to FIGS. 7 and 8.

Figure 7:
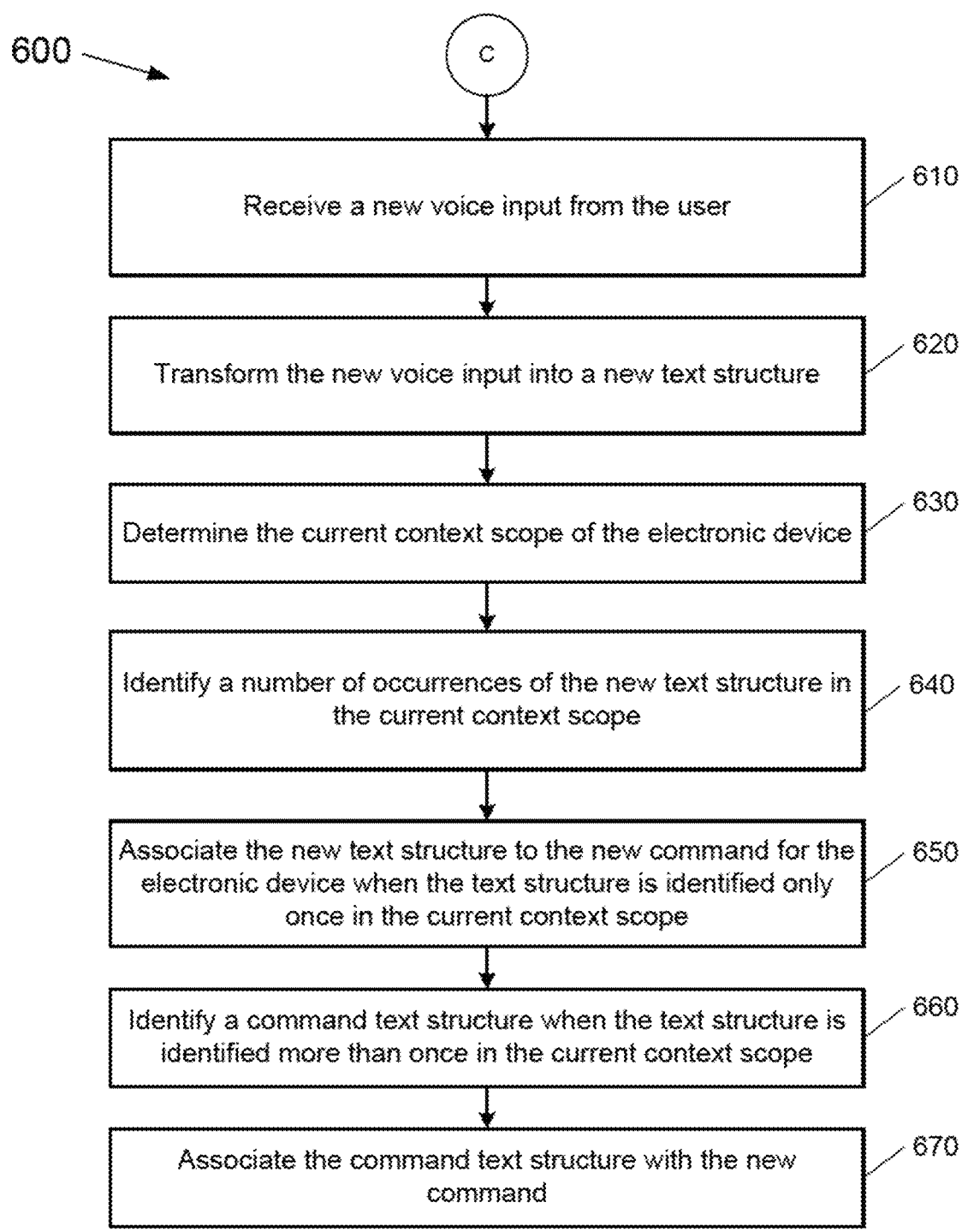
FIG. 7 illustrates a flow chart showing an example of a method for creating a new voice command for an electronic device in accordance with an implementation of the present disclosure.

FIG. 7 illustrates a flow chart showing an example of a method 600 for creating a new voice command for the electronic device 10. The method 600 may be performed with the command creation module 41 The method allows a user quickly navigate through the OS and to create new dynamic commands for specific context scopes of the device 10. The method 600 begins at 610, where the control unit 33 receives a new voice input from a user. For example, a user may provide a new voice input when he or she intentionally wants to create a new command. In that situation, the user may first provide an initial command to the device 10 to initiate creating a new command (e.g., "new command" "create a command," etc.) Alternatively, the new voice input may be provided when a user intends to provide a command to the device and such command does not exist in the "local" or the "global" commands available to the processor (see FIG. 3). At 620, the control unit transforms the new voce input into a new text structure. This step is similar to step 120 of the method 100. Next, at 630, the control unit determines the current context scope of the electronic device (similarly to step 130 of the method 100).

At 640, the control unit 33 identifies a number of occurrences of the new text structure in the current context scope. In other words, the control unit 33 unit determines whether the new text structure matches with a text structure in the current context. For example, if the context is a news website and the new text structure is "sports," the control unit identifies the number of occurrences of "sports" on the displayed website (if "sports" is not identified as one of the existing text structures associated with commands). In that situation, "sports" may be identified a tab on the news website that leads to the sports web page. The control unit may retrieve text information and the position data for the text information of the context scope (i.e., the displayed news website) directly from the framework of the OS. Alternatively the control unit may use Optical Character Recognition ("OCR") technology to convert an image of the context scope to text information and position data. That text information and position data is then searched to identify the number of occurrences of the new text structure.

The control unit may identify that the new text structure appears at one location or at multiple location of the context scope. At 650, the control unit 33 associates the new text structure to the new command for the electronic device when the text structure is identified only once in the current context scope. For example, when the text structure "sports" is identified only once on the news website, the control unit records an action of clicking on the "sports" link in the context space and that action is linked with a software code rule associated with the specific command (i.e., "sports"). As with the existing commands, the text structure, the command, and the associated software code rule are stored (e.g., in databases 20, 80, etc.). However, this new dynamic command is only associated with the very specific context scope that was recorded. In one implementation, the control unit may display a "new command" box that includes the name/text of the command (e.g., "sports"), the action associated with the command, etc. before creating the new command. The user may confirm or cancel the new command. Thus, the control unit creates a trigger between the text structure, the command, and the software code rule linked with the action, so when a user speaks the command again in this context scope the action is reproduced. This process may be repeated for any inexpressible object (e.g., icons, links, images, etc.) that includes text structure and can be identified by the control unit in the context scope of the device.

Alternatively, when the control unit 33 identifies the new text structure more than once in the current context scope, the control unit identifies a command text structure from the multiple text structures (at 660). For example, when the text structure "sports" is identified at multiple locations on the news website, the control unit 33 may highlight and number all locations of the text structure. The user may then select the preferred location of the new text structure (e.g., by speaking the desired number, etc.). The selected preferred location is the command text structure. At 670, the control unit associates the command text structure to the new command. This process is similar to the process described in step 650.

Figure 8:
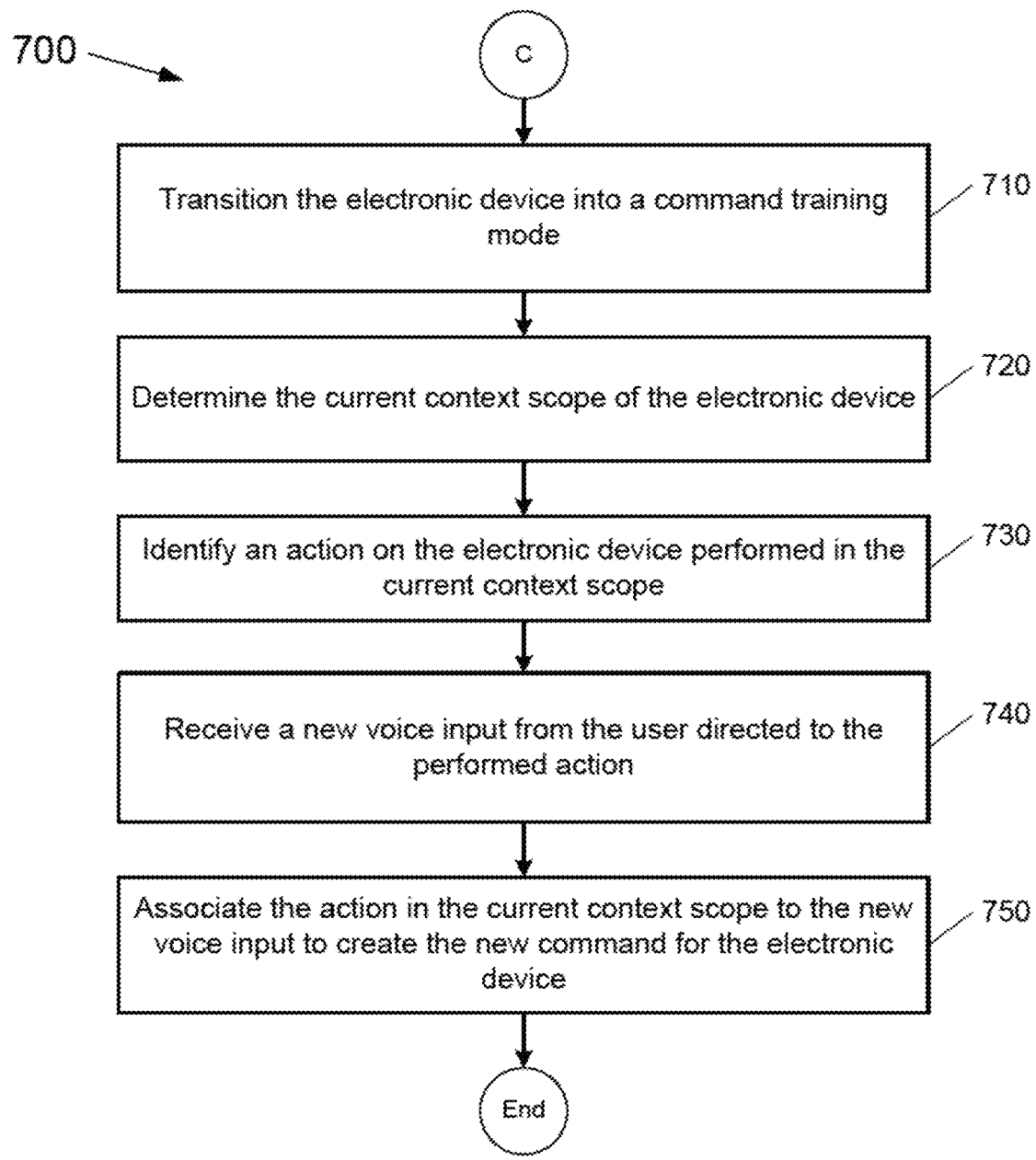
FIG. 8 illustrates a flow chart showing an example of an alternative method for creating a new voice command for an electronic device in accordance with an implementation of the present disclosure.

FIG. 8 illustrates a flow chart showing an example of an alternative method 700 for creating a new voice command for the electronic device 10. This method may applicable to creating commands for both actions that may include an act (e.g., tap, swipe, pinch, etc.) on the device 10 and to actions that cover inexpressible objects (e.g., icons, links, images, etc.). The method 700 may be performed with the command creation module 41.

The method 700 begins at 710, where the control unit 33 transitions the electronic device info a command training mode For example, the user may first provide an initial command to the device 10 to initiate training mode (e.g., "training," "training mode;" "create new command;" etc.). At 720, the control unit 33 determines the current context scope of the electronic device 10 (similarly to step 130 of the method 100). Then, at 730, the control unit identifies an action on the electronic device performed in the current context scope of the device 10. For example, the control unit records an action (e.g., tapping, swiping, pinching, etc.) in the context space that is performed by the user. Next, the control unit receives a new voice input from the user directed to the performed action (at 740). For example, the user may open a browser (i.e., context scope), click on the refresh button (i.e., performs an action identified by the control unit), and provide a voice input to the control unit ("refresh," "refresh the page, etc.).

In one implementation, the control unit 33 may then display a "new command" message box that includes the name/text of the command (e.g., "refresh"), the action associated with the command, etc. The user may confirm or cancel the new command. At 750, the control unit associates the action in the current context scope to the voice input to create the new command for the electronic device. For example, the action identified by the control unit is linked with a software code rule associated with the specific command (i.e., "refresh"). The text structure, the command, and the associate software code rule linked with the action are stored (e.g., in databases 20, 80. etc.).

The user may apply similar techniques to edit existing commands at any time. For example, the user may provide an initial command to the device 10 to initiate editing mode (e.g., "edit command," "change command," etc.). The control unit 33 may then display an "edit command" message box that may prompt the user to provide the desired command. After the user provides the command, the message box may prompt the user to provide the new command or the new action(s) associated with the command. The user may confirm or cancel the edits in the command by providing instructions to the control unit.

In addition, the proposed method 700 may be applicable to creating new commands for any inexpressible or abstract objects (e.g., icons, images, button, etc.) displayed on the display 32. For example, a user may initiate training mode by providing a command (e.g., "training," "training mode," "create new command," etc.). Next, the control unit determines the current context scope of the device (similarly to 720). Similarly to 730, the control unit identifies an action on the electronic device performed in the current context scope. In that example, the action may be creating a voice active area (e.g., touch/click macro) around the abstract object that may be performed with a voice command. For instance, the user may draw a polygon (e.g., using a touch or a mouse Input) around the abstract object on the display to create a voice active area (e.g., a macro). The control unit then receives a new voice input from the user directed to the performed action (Similarly to steps 740). The new command may be recorded as a hyperlink or a clickable action and it will be saved in a database. Thus, the next time the control unit identifies that context scope and receives the related command, the control unit will execute the macro to perform a click or touch on that object. The same abstract object on the display may be assigned multiple voice commands.

With continued reference to FIG. 8, the control unit 33 detects at least one voice input from a user of an electronic device (at 520). That step is similar to step 110 of the method 100. At 530, the control unit transforms the at least one voice input into a text structure including at least one word (similarly to step 120 of the method 100). At 540, the control unit determines the current context scope of the electronic device. This step is similar to step 130 of the method 100. Next, the control unit 33 compares the text structure to a plurality of existing text structures. These existing text structures include the new commands created by the user. This step is similar to step 140 of the method 100. Finally, the control unit identifies a command when the text structure matches with at least one of the existing text structures. This step is similar to step 150 of the method 100.

What is claimed is:

1. A method, comprising:
transitioning an electronic device into a command training mode or a new command creation mode wherein a voice command for the electronic device is trained or created;
after transitioning to the command training mode or the new command creation mode:
determining a current context scope of the electronic device, the current context scope including an application, process or activity currently running on the electronic device;
identifying an action on the electronic device performed in the current context scope of the electronic device;
subsequent to the identifying of the action having been performed, receiving a voice input from a user of the electronic device directed to the performed action; and
associating the action in the current context scope to the voice input to create a command for the electronic device for future invoking of the performed action, the creating of the command including:
(i) transforming the voice input into a text structure,
(ii) identifying a number of occurrences of the text structure in the current context scope, and,
(iii) when the text structure is identified only once in the current context scope yielding a single occurrence of the text structure, associating the single occurrence of the text structure with the command, and,
(iv) when the text structure is identified multiple times in the current context scope yielding multiple occurrences of the text structure, receiving, from a control unit of the electronic device of the user, selection of one of the multiple occurrences of the text structure, identifying a command text structure from the selected one of the multiple occurrences of the text structure and associating the identified command text structure with the command the method further comprising:
receiving a different voice input from the user;
transforming the different voice input to a different text structure;
comparing the different text structure to a plurality of existing text structures associated with the current context scope of the electronic device;
when the different text structure does not match at least one of the existing text structures associated with the current context scope of the electronic device, comparing the different text structure to a plurality of existing text structures not associated with the current context scope of the electronic device;

when the different text structure matches at least one of the existing text structures not associated with the current context scope of the electronic device, identifying a global command for the electronic device not associated with the current context scope of the electronic device; and performing a corresponding action on the electronic device based on the identified global command.

2. The method of claim 1, further comprising connecting at least two sequential voice inputs from the user and performing an action based on the connected sequential voice inputs, the at least two sequential voice inputs including a first voice input followed by a second voice input.

3. The method of claim 2, further comprising:
identifying a first command from the first voice input of the at least two sequential voice inputs;
identifying a second command from the second voice input of the at least two sequential voice inputs;
determining whether a time between the first voice input and the second voice input exceeds a predetermined threshold;
determining whether the second command is a semantic continuation of the first command; and
correlating the second command with the first command to perform an action on the electronic device when the time between the first voice input and the second voice input does not exceed a predetermined threshold and when the second command is a semantic continuation of the first command.

4. The method of claim 1, further comprising:
when the text structure does not match at least one of the existing text structures associated with the current context scope of the electronic device, computing a possibility score for a target command based on the voice input;
comparing the possibility score of the target command to a predetermined tolerance threshold associated with the target command;
identifying a command when the possibility score of the target command exceeds the threshold;
proposing to create a new command, wherein the new command includes an action on the electronic device; and
receiving confirmation from the user regarding creation of the new command.

5. The method of claim 1, further comprising:
recording, in the command training mode, the command as one of a hyperlink or a clickable action and saving the command in a database.

6. The method of claim 1, further comprising:
when the text structure matches at least one of the existing text structures associated with the current context scope of the electronic device, identifying a command for the electronic device in the current context scope of the electronic device; and
when the text structure matches at least one of the existing text structures associated with the current context scope of the electronic device, performing an action on the electronic device in the current context scope of the electronic device based on the identified command.

7. The method of claim 1, wherein the current context scope is to be displayed on the electronic device and includes text information and position data for the text information, wherein identifying the number of occurrences of the text structure includes searching the text information and the position data for the text information, and wherein identifying the command text structure from the multiple text structures includes identifying a location of the command text structure using the position data.

8. A system comprising:
an electronic device having at least one processing device with a control unit to transition the electronic device into a command training mode or a new command creation mode wherein a voice command for the electronic device is trained or created, and after transitioning to the command training mode or the new command creating mode, the control unit to:
determine a current context scope of the electronic device, the current context scope of the electronic device including an application, process or activity currently performed by the electronic device,
identify an action on the electronic device performed in the current context scope of the electronic device,
subsequent to the identifying of the action having been performed, receive a voice input from a user of the electronic device directed to the performed action, and
associate the action in the current context scope to the voice input to create a command for the electronic device, including (i) transform the voice input into a text structure, (ii) identify a number of occurrences of the text structure in the current context scope, and, (iii) when the text structure is identified only once in the current context scope yielding a single occurrence of the text structure, associate the single occurrence of the text structure with the command, and, (iv) when the text structure is identified multiple times in the current context scope yielding multiple occurrences of the text structure, receive, from the control unit of the electronic device or the user, selection of one of the multiple occurrences of the text structure, identify a command text structure from the multiple occurrences text structure and associate the identified command text structure with the command, wherein the control unit is to further:
receive a different voice input from the user;
transform the different voice input to a different text structure;
compare the different text structure to a plurality of existing text structures associated with the current context scope of the electronic device,
when the different text structure does not match at least one of the existing text structures associated with the current context scope of the electronic device, compare the different text structure to a plurality of existing text structures not associated with the current context scope of the electronic device;
identify a global command for the electronic device when the different text structure matches at least one of the existing text structures not associated with the current context scope of the electronic device; and
perform a corresponding action on the electronic device based on the identified global command.

9. The system of claim 8, wherein, in the command training mode, the control unit is to:
record the command as one of a hyperlink or a clickable action and save the command in a database.

10. The system of claim 8, wherein the control unit is to:
identify a command for the electronic device for the current context scope of the electronic device when the text structure matches at least one of the existing text structures associated with the current context scope of the electronic device, and perform an action on the electronic device for the current context scope of the electronic device based on the identified command when the text structure matches at least one of the existing text structures associated with the current context scope of the electronic device.

11. The system of claim 8, wherein the current context scope is to be displayed on the electronic device and includes text information and position data for the text information, wherein the number of occurrences of the text structure is to be identified by search of the text information and the position data for the text information, and wherein the command text structure is to be identified from the multiple text structures based on a location of the command text structure using the position data.

12. A non-transitory machine-readable storage medium encoded with instructions executable by at least one processing device of an electronic device, the machine-readable storage medium comprising instructions to:
  transition the electronic device into a command training mode or a new command creation mode wherein a voice command for the electronic device is trained or created;
  after transitioning to the command training mode or the new command creation mode;
  determine a current context scope of the electronic device, the current context scope of the electronic device including an application, process or activity currently running on or performed by the electronic device;
  identify an action on the electronic device performed in the current context scope of the electronic device;
  subsequent to the identifying of the action having been performed, receive a voice input from a user of the electronic device directed to the performed action; and
  associate, in the command training mode, the action in the current context scope to the voice input to create a command for the electronic device for future invoking of the performed action, the creating of the command including:
    (i) transform the voice input into a text structure, (ii) identify a number of occurrences of the text structure in the current context scope, and, (iii) when the text structure is identified only once in the current context scope yielding a single occurrence of the text structure, associate the single occurrence of the text structure with the command, and, (iv) when the text structure is identified multiple times in the current context scope yielding multiple occurrences of the text structure, receive, from a control unit of the electronic device or the user, selection of one of the multiple occurrences of the text structure, identify a command text structure from the multiple occurrences of the text structure and associate the identified command text structure with the command,
  the method further comprising instructions to:
  receive a different voice input from the user;
  transform the different voice input to a different text structure;
  determine whether the different text structure matches at least one existing text structure from a plurality of existing text structures associated with the current context scope of the electronic device;
  when the different text structure does not match at least one of the existing text structures associated with the current context scope of the electronic device, compare the different text structure to a plurality of existing text structures not associated with the current context scope of the electronic device;
  identify a global command for the electronic device when the different text structure matches at least one of the existing text structures not associated with the current context scope of the electronic device; and
  perform a corresponding action on the electronic device based on the identified global command.

13. The non-transitory machine-readable storage medium of claim 12, further comprising instructions to connect at least two sequential voice inputs from the user to perform an action based on the connected sequential voice inputs, the at least two sequential voice inputs including a first voice input followed by a second voice input.

14. The non-transitory machine-readable storage medium of claim 13, further comprising instructions to:
  identify a first command from the first voice input of the at least two sequential voice inputs;
  identify a second command from the second voice input of the at least two sequential voice inputs;
  determine whether a time between the first voice input and the second voice input exceeds a predetermined threshold;
  determine whether the second command is a semantic continuation of the first command; and
  correlate the second command with the first command to perform an action on the electronic device when the time between the first voice input and the second voice input does not exceed the predetermined threshold and when the second command is a semantic continuation of the first command.

15. The non-transitory machine-readable storage medium of claim 12, further comprising instructions to:
  when the text structure does not match at least one of the existing text structures associated with the current context scope of the electronic device, compute a possibility score for a target command based on the voice input;
  compare the possibility score of the target command to a predetermined tolerance threshold associated with the target command;
  identify a command when the possibility score of the target command exceeds the tolerance threshold;
  propose to create a new command, wherein the new command includes an action on the electronic device; and
  receive confirmation from the user regarding creation of the new command.

16. The non-transitory machine-readable storage medium of claim 12, further comprising instructions to record the command as one of a hyperlink or a clickable action and save the command in a database.

17. The non-transitory machine-readable storage medium of claim 12, further comprising instructions to:
  identify, when the text structure matches at least one of the existing text structures associated with the current context scope of the electronic device, a command for the electronic device for the current context scope of the electronic device; and
  perform, when the text structure matches at least one of the existing text structures associated with the current context scope of the electronic device, an action on the electronic device for the current context scope of the electronic device based on the identified command.

18. The non-transitory machine-readable storage medium of claim 12, wherein the current context scope is to be displayed on the electronic device and includes text information and position data for the text information, wherein the number of occurrences of the text structure is to be identified by search of the text information and the position data for the text information, and wherein the command text structure is to be identified from the multiple text structures based on a location of the command text structure using the position data.

\* \* \* \* \*